United States Patent
Itoh et al.

(10) Patent No.: US 7,118,239 B2
(45) Date of Patent: Oct. 10, 2006

(54) SUNROOF PANEL APPARATUS FOR A VEHICLE

(75) Inventors: Yoshiyasu Itoh, Tochigi (JP); Akihiko Kuribayashi, Saitama (JP); Michio Tamura, Saitama (JP)

(73) Assignees: Yachiyo Kogyo Kabushiki Kaisya, Saitama (JP); Honda Motor Co., Ltd., Tokyo (JP)

( * ) Notice: Subject to any disclaimer, the term of this patent is extended or adjusted under 35 U.S.C. 154(b) by 59 days.

(21) Appl. No.: 10/951,742

(22) Filed: Sep. 28, 2004

(65) Prior Publication Data

US 2005/0073851 A1   Apr. 7, 2005

(30) Foreign Application Priority Data

Oct. 1, 2003   (JP) ............... 2003-342898

(51) Int. Cl.
*F21V 9/16* (2006.01)
*H01J 1/62* (2006.01)

(52) U.S. Cl. ............... 362/84; 362/493; 313/512

(58) Field of Classification Search ............ 362/84, 362/493, 479, 490; 313/506–507, 512; 428/690
See application file for complete search history.

(56) References Cited

U.S. PATENT DOCUMENTS

| | | | | |
|---|---|---|---|---|
| 4,733,488 A | * | 3/1988 | Yokoyama et al. | 40/544 |
| 5,051,654 A | * | 9/1991 | Nativi et al. | 313/506 |
| 5,336,965 A | * | 8/1994 | Meyer et al. | 313/498 |
| 5,583,394 A | * | 12/1996 | Burbank et al. | 313/498 |
| 6,876,147 B1 | * | 4/2005 | Utsumi | 313/506 |

FOREIGN PATENT DOCUMENTS

JP        56-1465        1/1981

* cited by examiner

*Primary Examiner*—Ali Alavi
(74) *Attorney, Agent, or Firm*—Fish & Richardson P.C.

(57) ABSTRACT

A sunroof panel apparatus for a vehicle includes a pair of sheets of transparent glass, a pair of transparent interlayers, and a plurality of electro-luminescent (EL) sheets. The transparent interlayers are enclosed between the sheets of transparent glass. The EL sheets are enclosed between the transparent interlayers and each EL sheet has electrode layers with terminals. The terminals are electrically connected through a variable resister and a power supply.

6 Claims, 8 Drawing Sheets

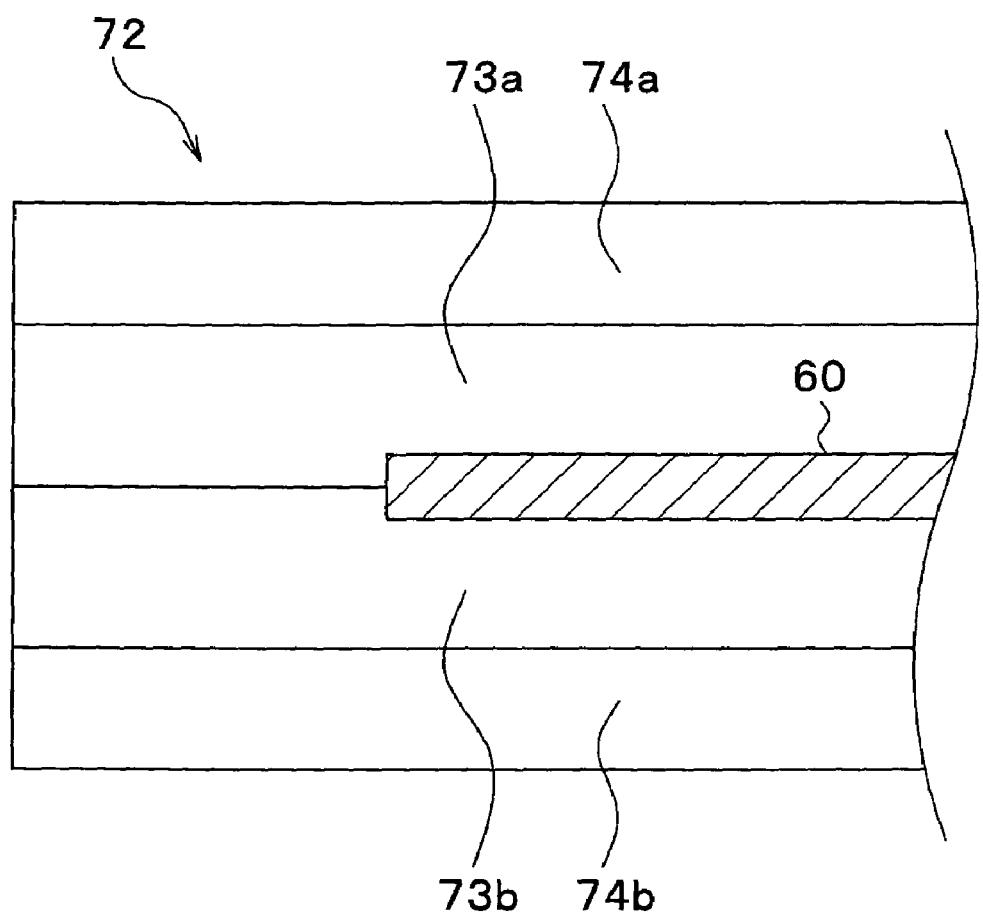

SUNROOF PANEL APPARATUS FOR A VEHICLE

BACKGROUND OF THE INVENTION

An apparatus consistent with the present invention relates to a sunroof panel apparatus for a vehicle which is able to illuminate its cabin.

There are different types of lights used in the cabin of a vehicle, such as a room light for uniform illumination, a personal light for reading by a passenger without disturbing the view of a driver and a map light for reading a map. It has been worked out to select an appropriate one according to purposes. For example, Japanese Examined Utility Model Application Publication S56-1465 discloses a lighting apparatus for illuminating a cabin of vehicle which is an integrated assembly including a room light and a personal light, thereby decreasing the number of parts.

However, the conventional lighting apparatus disclosed in the above document creates such a high contrast between an illuminated portion and a shadowed portion that it contributes to eyestrain. In addition, it spoils the beauty of the cabin, because the lighting apparatus dictates that its unit including a lamp and a lens protrudes from the ceiling of cabin.

On the other hand, an electro-luminescent (EL) sheet has been widely noticed of late years as lighting and display apparatus, which excels in achieving thinner thickness, lighter weight as well as more luminescent colors. FIG. 6 is an example of cross sectional view illustrating the structure of EL sheet. As shown in FIG. 6, an EL sheet 60 includes a transparent base plate 61. A transparent electrode layer 62 is formed on an upper surface of the transparent base plate 61. A luminous layer 63, an insulation layer 64 and a back electrode layer 65 are one by one laid down on the transparent electrode layer 62. Incidentally in FIG. 6, thickness of a layer relative to the total thickness of whole layers is schematically illustrated with an unrepresentative dimension, for convenience sake. Hereinafter, drawings illustrating the structure of an EL sheet are described in a similar fashion.

When the EL sheet 60 is connected to an AC power supply 66 so as to impose an alternate voltage on it, it emits light by repeating separation and recombination of electrons and positive holes in the luminous layer 63. In this connection, a material which possesses a smaller work function relative to the transparent electrode layer 62 is required for the back electrode layer 65. However, practically speaking, it is difficult to find a material which meets both the small work function and transparency. This results in use of an opaque material for the back electrode layer 65. In this case, the EL sheet 60 shown in FIG. 6 emits light through the transparent base plate 61 (downward direction in FIG. 6)

A panel including laminated sheets of glass, between which the EL sheet 60 is enclosed, can be used as a sunroof panel apparatus with illumination for a vehicle (hereinafter referred to as "sunroof panel apparatus 72"), if it is mounted to a vehicle in the following manner. As shown in FIG. 7, this apparatus 72 is installed in an opening 71 made in a fixed vehicle roof 70 while the transparent base plate 61 is oriented toward the inside of a cabin. FIG. 8 is a schematic diagram illustrating a sectional structure of the sunroof panel apparatus 72 which encloses the EL sheet 60. As shown in FIG. 8, the EL sheet 60 (layer structure not shown) is sandwiched between laminated sheets of glass 74a and 74b through transparent enclosing members 73a and 73b. Because the EL sheet 60 uniformly emits light by surface luminescence, the sunroof panel apparatus 72 can prevent eyestrain. Furthermore, because the EL sheet 60 is enclosed between the laminated sheets of glass 74a and 74b and free from protrusions, the sunroof panel apparatus 72 does not spoil the beauty of the cabin of a vehicle.

However, the sunroof panel apparatus 72 is not satisfactory when it is used as a light illuminating the cabin for multiple purposes described above. The luminescence created by the EL sheet 60 can serve as a room light, but can not serve as a personal light or a map light which requires locally high illumination.

SUMMARY OF THE INVENTION

The present invention seeks to provide a sunroof panel apparatus with illumination for a vehicle, which is able not only to prevent eyestrain but also not to spoil the beauty of the cabin in serving as a light for multiple purposes.

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

According to one aspect of the present invention, a sunroof panel apparatus for a vehicle comprises a pair of sheets of transparent glass, a pair of transparent interlayers, and a plurality of electro-luminescent (EL) sheets. The transparent interlayers are enclosed between the sheets of transparent glass. The EL sheets are enclosed between the transparent interlayers and each EL sheet has electrode layers with terminals. The terminals are electrically connected through a variable resister and a power supply.

When the apparatus described above is used as a room light in the cabin of a vehicle, it is possible to prevent eyestrain because the EL sheets provide uniform surface emitting. In addition, because the EL sheets are enclosed in the sheets of glass so as to eliminate protrusions, the apparatus is also able to maintain good appearance of the cabin.

Furthermore, because the electrode layers of each EL sheet have terminals which are electrically connected through the variable resister and the power supply, the apparatus can be flexibly used according to purposes. For example, when a sunroof panel apparatus has four EL sheets: one above a driver's seat, one above an assistant driver's seat, one above a rear seat behind the driver's seat and the other one above a rear seat behind the assistant driver's seat, it is possible to use the apparatus as a map light if the EL sheet above the driver's seat is turned on and its brightness is adjusted to be high enough to read a map. It is also possible to use the apparatus as a room light if all the EL sheets are turned on and appropriate brightness for the cabin is obtained by adjusting variable resisters. Furthermore, it is possible for a passenger sitting on the assistant driver's seat to use the apparatus as a personal light if he turns on only the EL sheet above him and adjusts the variable resister to acquire brightness which does not disturb the view of a driver.

According to another aspect of the present invention, a sunroof panel apparatus for a vehicle further comprises a sheet of inner glass and a condenser lens. The sheet of inner glass and a sheet of transparent glass form a space layer, and the condenser lens is disposed in the space layer.

Because when the EL sheet above the condenser lens is turned on, which focuses rays of light on a spot, the apparatus is able to exhibit better performance in serving as a map light and a personal light.

According to still another aspect of the present invention, a sunroof panel apparatus for a vehicle is provided, in which at least one of the EL sheets emits light in both inward and outward directions relative to a cabin of the vehicle.

It is possible to use the apparatus described above as both a room light and an illumination light which externally decorates the vehicle.

BRIEF DESCRIPTION OF THE DRAWINGS

FIG. 8 is a sectional view illustrating a sunroof panel apparatus with an enclosed EL sheet according to the prior art.

DETAILED DESCRIPTION OF THE PREFERRED EMBODIMENTS

The aspects of the present invention will become more apparent by describing in detail illustrative; non-limiting embodiments thereof with reference to the accompanying drawings.

Figure 1:
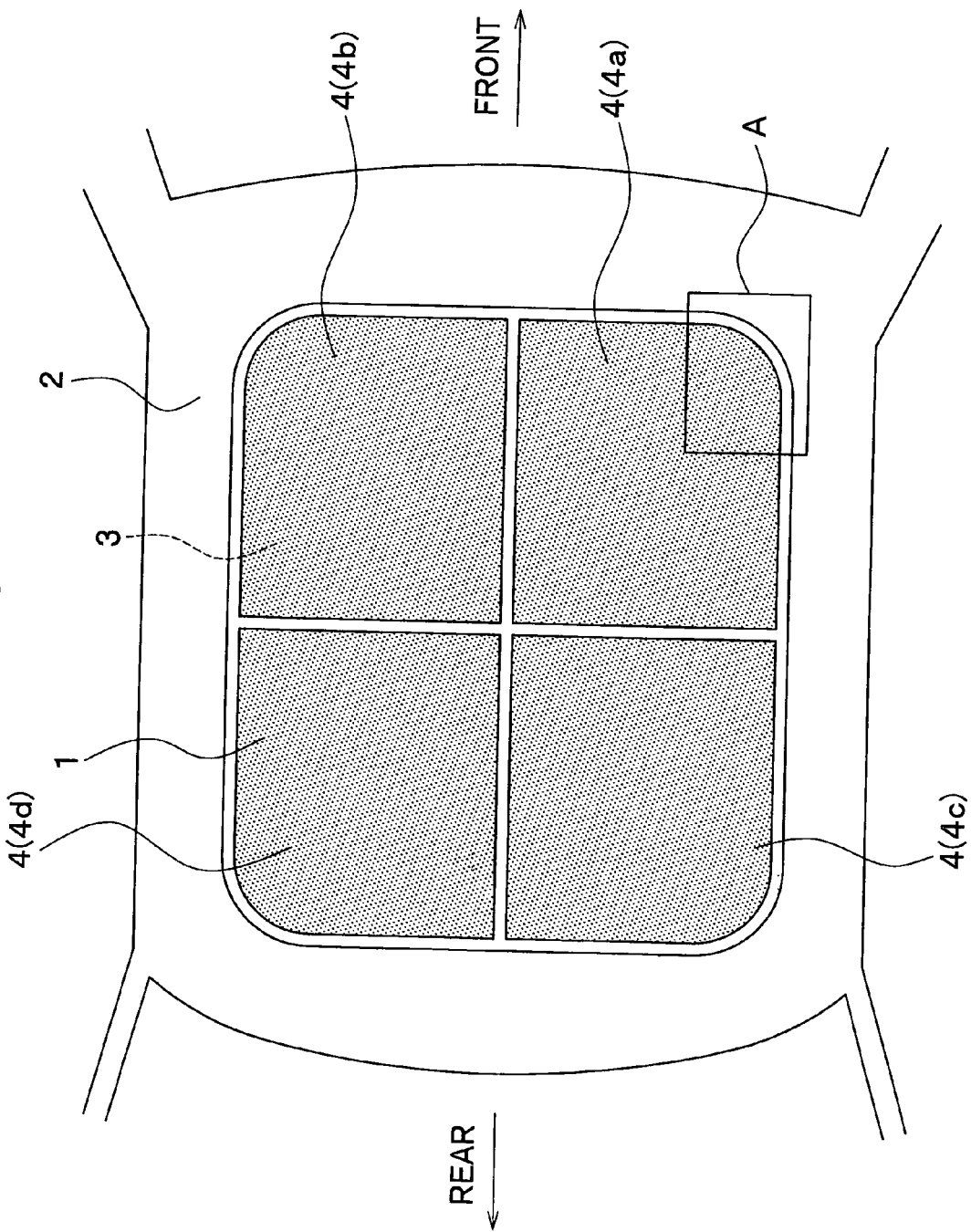
FIG. 1 is a top view illustrating a sunroof panel apparatus according to the present invention.

As shown in FIG. 1, a sunroof panel apparatus 1 is installed in an opening 3 made in a fixed vehicle roof 2. Four EL sheets 4, designated as 4a, 4b, 4c and 4d respectively, are enclosed in the apparatus 1. The EL sheet 4a is located above a driver's seat, the EL sheet 4b above an assistant driver's seat, the EL sheet 4c above a rear seat behind the driver's seat and the EL sheet 4d above a rear seat behind the assistant driver's seat.

Figure 2:
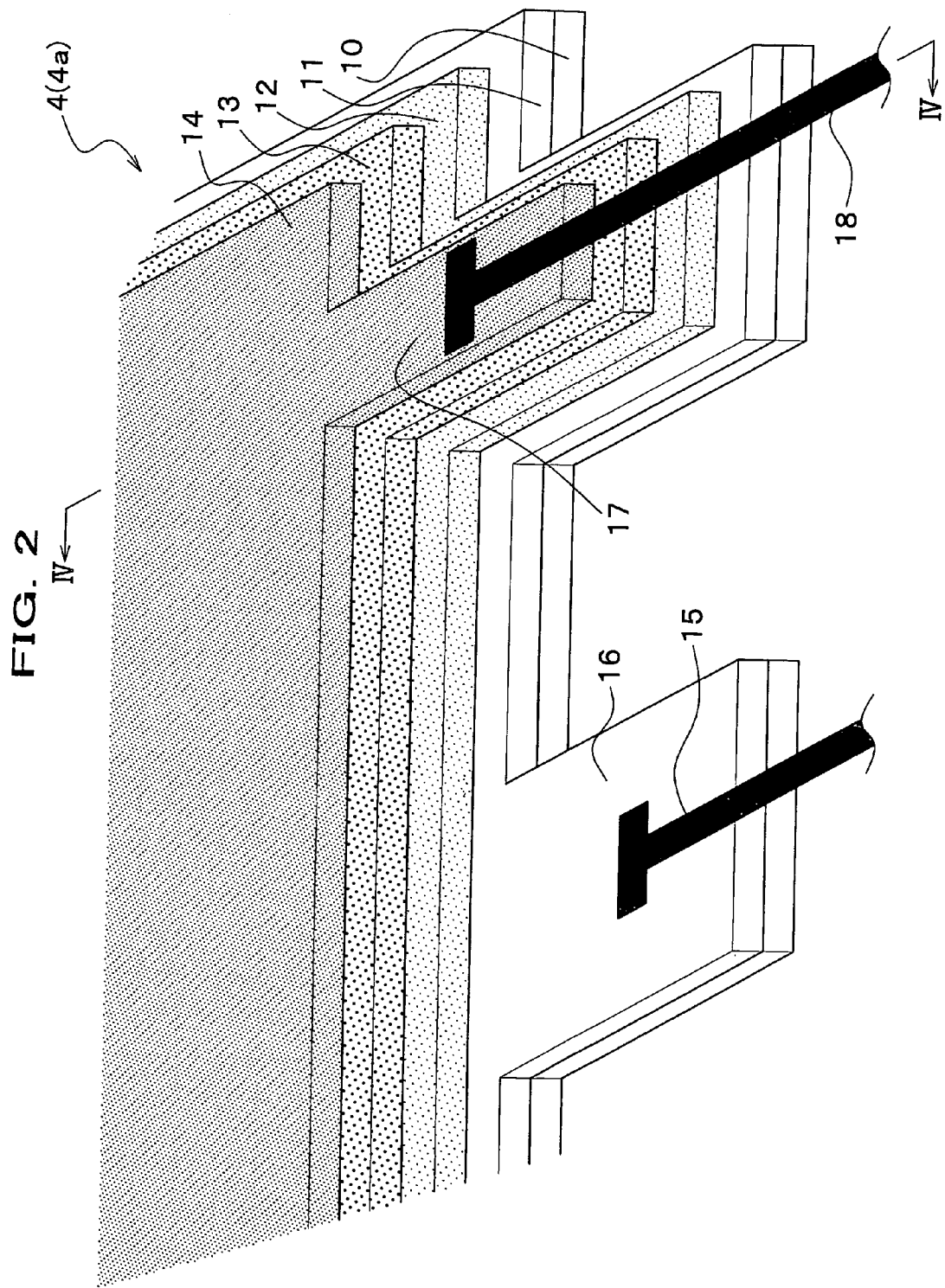
FIG. 2 is a perspective view depicting a vicinity of a terminal of EL sheet shown in an area A of FIG. 1.

As shown in FIG. 2, each of the EL sheets 4 (4a–4d) has structure of layers, a transparent electrode layer 11, a luminous layer 12, an insulation layer 13 and a back electrode layer 14, which are one by one laid down on a transparent base plate 10.

Any material is acceptable for the transparent base plate 10 as long as it is electrically non-conductive. For example, it is possible to select a material excelling in workability such as Polyethylene Terephthalate (PET). Similarly, as for the transparent electrode layer 11, there is no restriction for a material as long as it is sufficiently transparent and electrically conductive. It may be possible to adopt Indium Tin Oxide (ITO), for example.

As for a light-emitting substance forming the luminous layer 12, any material is acceptable as long as it belongs to Electro Luminescent. It may be possible to select Zinc sulfide (ZnS) as an example, which is able to emit light of high intensity. Also as for an insulating substance used for the insulation layer 13, any material is acceptable as long as it has a high dielectric characteristic. Barium titanate (BaTiO$_3$) may be an example.

As for the back electrode layer 14, any material is adoptable as long as it possesses smaller work function than that of the transparent electrode layer 11. For example, when ITO is applied to the transparent electrode layer 11, it may be possible to adopt carbon.

It may be preferably but not necessarily possible to select thickness of each layer as follows: 75–125 μm for the transparent base plate 10, 3–5 μm for the transparent electrode layer 11, 20–40 μm for the luminous layer 12, 10–30 μm for the insulation layer 13 and 10–30 μm for the back electrode layer 14, respectively.

Next an exemplary method for manufacturing the EL sheets 4 (4a, 4b, 4c and 4d) is described. First, a transparent electrode layer 11 is formed on a transparent base plate 10 made of PET and the like. When ITO is adopted as the transparent electrode layer 11, it is formed by deposition or painting a solution for forming an ITO layer, in which ITO powder is dissolved in a solvent. Next, a luminous layer 12 is formed on the transparent electrode layer 11 by screen printing. Under this process, sufficient attention should be paid to fabrication of a screen plate so that the luminous layer 12 is not printed on a terminal 16 to which a wire harness 15 is connected. Subsequently, an insulation layer 13 and a back electrode layer 14 are one by one formed on the luminous layer 12 by screen printing.

The wire harness 15 is connected to the terminal 16 provided on the transparent electrode layer 11. Also a wire harness 18 is connected to a terminal 17 provided on the back electrode layer 14. Method for wire harness connection is not limited as long as it establishes electrical continuity, and it may be possible to use a silver paste adhesive for the method, for example.

Figure 3:
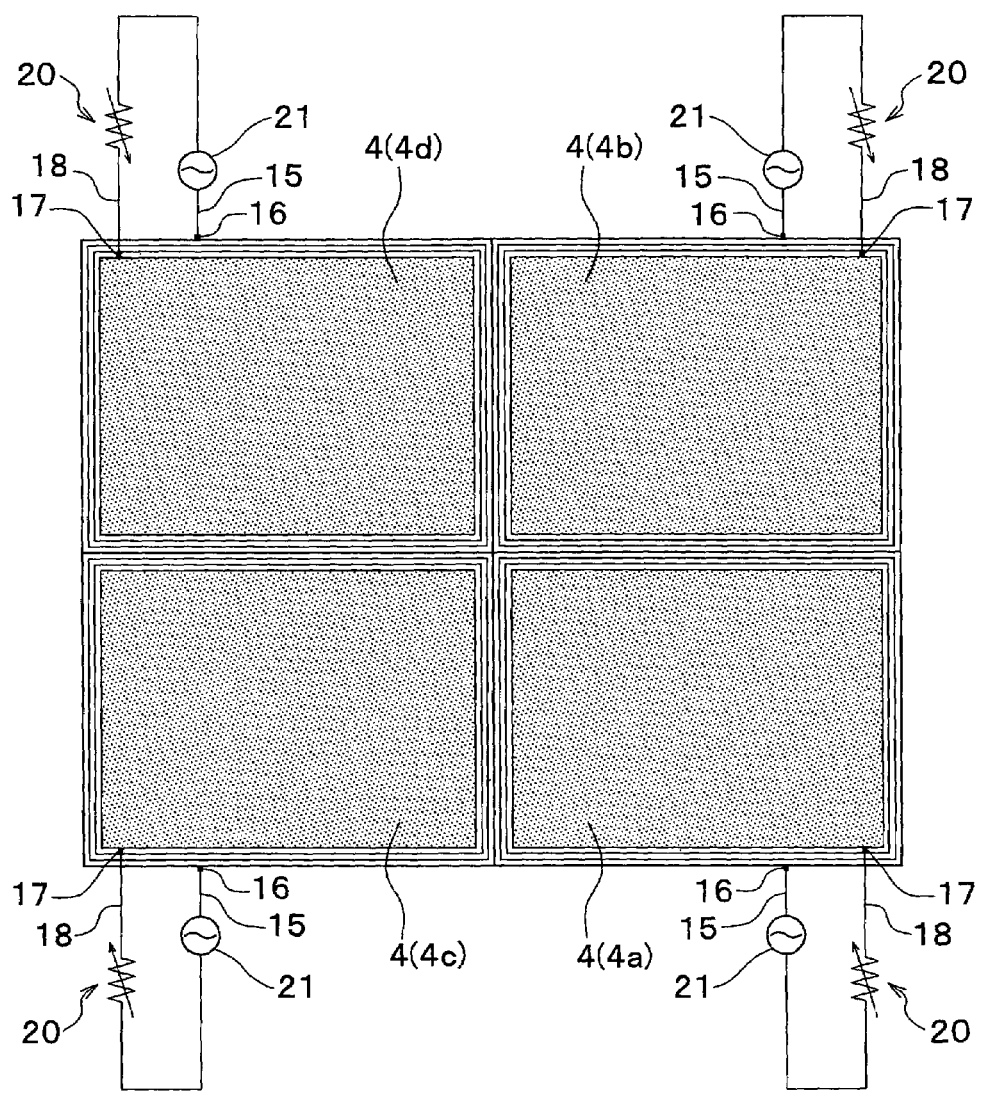
FIG. 3 is a schematic diagram illustrating electrical connection of EL sheets.

As shown in FIG. 3, in each of the EL sheets 4, the terminals 16 and 17 are electrically connected by the wire harness 15 and the wire harness 18 to make a closed loop through a variable resister 20 and an AC power supply 21. In this way, a sunroof panel apparatus 1 (see FIG. 1) can be flexibly used according to purposes. For example, it is possible to use the apparatus 1 as a map light if the EL sheet 4a located above a driver's seat is selectively turned on and the variable resister 20 is adjusted so that its brightness is kept appropriate for reading a map. It is also possible to use the apparatus 1 as a room light if all the EL sheets 4 are turned on and appropriate brightness for the cabin is obtained by adjusting variable resisters 20. Furthermore, it is possible for a passenger sitting on an assistant driver's seat to use the apparatus 1 as a personal light if he selectively turns on the EL sheet 4b above him and adjusts its variable resister 20 so that the brightness does not disturb the view of a driver.

Figure 4:
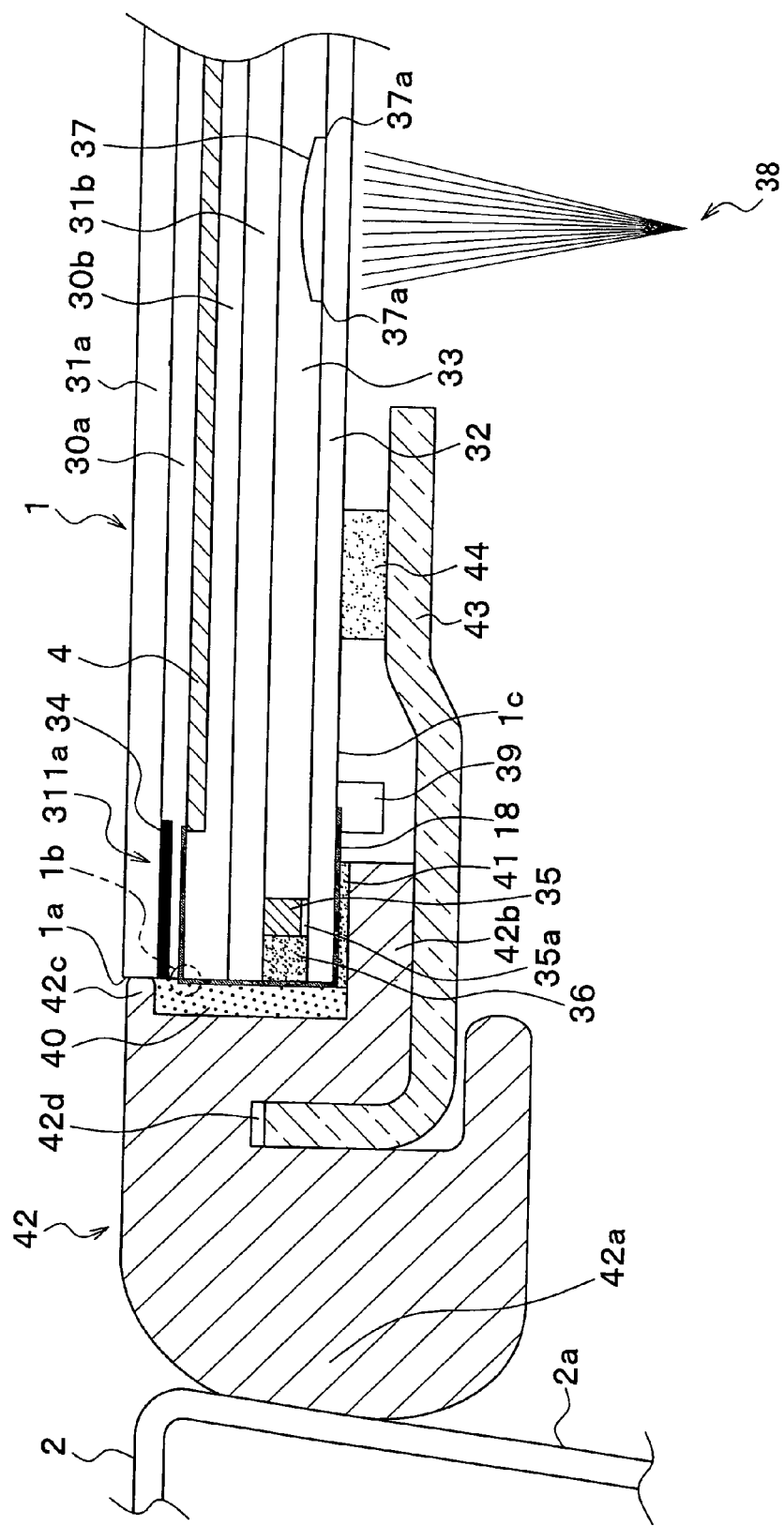
FIG. 4 is a sectional view taken along line IV—IV in FIG. 2 showing the structure of a sunroof panel apparatus according to the present invention.

Next, description is given of the structure of sunroof panel apparatus 1. As shown in FIG. 4, each EL sheet 4 is sandwiched between a pair of sheets of transparent glass 31a and 31b through transparent interlayers 30a and 30b. The apparatus 1 has a space layer 33 which is defined by the sheet of transparent glass 31b and a sheet of inner glass 32 that faces the inside of a cabin. Each EL sheet 4, which orients its transparent base plate 10 (see FIG. 2) toward the inside of the cabin (downward in FIG. 4), is enclosed in the sheets of transparent glass 31a and 31b. In this way, it is possible to use the light emitted by each EL sheet 4 for illuminating the cabin.

As for the interlayers 30a and 30b, it may be preferably but not necessarily possible to adopt plastic films such as Poly Vinyl Butyral (PVB) and Ethylene Vinyl Acetate (EVA) copolymer, which excel in compatibility with glass in terms of adhesion. As for the sheets of transparent glass 31a and 31b, it may be preferably but not necessarily possible to select sheets of glass which is able to cut ultraviolet light so as to improve the durability of each EL sheet 4. There are some types of glass capable of cutting ultraviolet light, for example glass which inherently absorbs or reflects ultraviolet light and another one on which a sheet of film cutting ultraviolet light is bonded.

Next, description is given of an exemplary method for enclosing each EL sheet 4 into the laminated sheets of transparent glass 31a and 31b. First, each EL sheet 4 is sandwiched between the interlayers 30a and 30b. These interlayers 30a and 30b are further sandwiched between the sheets of transparent glass 31a and 31b, which are then subjected to heated and pressurized environment in an auto clave so as to enclose the EL sheets 4 into the laminated sheets of transparent glass 31a and 31b. During this process, the wire harness 15 and the wire harness 18 (see FIG. 2), which are connected to each EL sheet 4, are drawn out through a gap between the interlayers 30a and 30b.

As shown in FIG. 4, it may be preferable, but not necessarily, to provide a concealing layer for an inner end portion 311a of the sheet of transparent glass 31a, which faces toward the outside of cabin, by applying a black ceramic paint, for example. In this way, because routing of wire harness of each EL sheet 4 can not be noticed outwardly, it is possible not to spoil the beauty of the sunroof panel apparatus 1.

The sheet of transparent glass 31b, which faces toward the inside of cabin, and the sheet of inner glass 32 interpose a spacer 35, thereby creating the space layer 33. A venting path 35a is provided under the spacer 35 and a desiccant 36 is laid along the outer periphery of the spacer 35. Because the air in the space layer 33 contacts with the desiccant 36, dried conditions can always be maintained in the space layer 33. In this connection, the spacer 35 and the desiccant 36 are attached to the lower surface of the sheet of transparent glass 31b and the upper surface of the sheet of inner glass 32 with an adhesive, for example.

The sunroof panel apparatus 1 has a condenser lens 37 in the space layer 33, whose position is so arranged that it lies above and ahead relative to a driver's seat.

When the EL sheet 4a (see FIG. 1) which lies above the condenser lens 37 is turned on, it is possible to increase the illuminance for the vicinity of a spot 38 on which the condenser lens 37 focuses rays of light. In this way, the sunroof panel apparatus 1 more efficiently serves as a map light for a driver at the driver's seat. In this connection, the condenser lens 37 can be attached to the sheet of inner glass 32 with an adhesive applied to a peripheral portion 37a of the condenser lens 37, for example.

The wire harness 18 connected to each EL sheet 4 is guided out through a harness guide port 1b provided in an outer peripheral surface 1a. This wire-harness 18 is routed along the outer peripheral surface 1a and a cabin-facing surface 1c (a lower surface of the sheet of inner glass 32) of the apparatus 1, being connected to a power-supplying coupler 39 which is attached to the cabin-facing surface 1c. Also, the wire harness 15 (see FIG. 2) is connected to the power-supplying coupler 39 in a similar fashion. The wire harnesses 15 and 18, which are connected to the power-supplying coupler 39, are electrically connected to each other through the variable resister 20 and the AC power supply 21 (see FIG. 3). The power-supplying coupler 39 may be attached to the cabin-facing surface 1c by an adhesive, for example. If a DC power supply is used instead of the AC power supply 21, it may be possible to conduct DC-to-AC conversion by introducing an inverter electrically connected to the DC power supply.

Next, description is given of a frame structure of the sunroof panel apparatus 1. As shown in FIG. 4, a sealing member 40 is bonded along the outer peripheral surface 1a of the sunroof panel apparatus 1, sealing the harness guide port 1b. In this way, it is possible to prevent water from intruding through the harness guide port 1b. Furthermore, because the outer peripheral surface of desiccant 36 is sealed by the sealing member 40, it is possible to prevent water from intruding the space layer 33 so as to avoid dew condensation. Any material is acceptable for the sealing member 40 as long as it not only excels in gas impermeability and stickiness but also has high viscosity under room temperature. It may be preferably but not necessarily possible to adopt Butyl rubber, which is a copolymer of isobutylene and isoprene.

The sealing member 40 is enclosed between the outer peripheral surface 1a of the sunroof panel apparatus 1 and a weatherstrip 42, which is disposed around the outer peripheral portion of the sunroof panel apparatus 1 with application of an adhesive 41. In this way, the sealing member 40 can stably keep its shape. The weatherstrip 42 includes a curved portion 42a, a horizontal portion 42b, a lip-like portion 42c and a groove portion 42d. The curved portion 42a occupies an outer peripheral portion of the weatherstrip 42. The horizontal portion 42b occupies a lower and inner peripheral portion of the weatherstrip 42. The lip-like portion 42c occupies an upper and inner peripheral portion of the weatherstrip 42. The groove portion 42d is made between the curved portion 42a and the horizontal portion 42b. A panel holder 43, which supports the sunroof panel apparatus 1, is inserted into the groove portion 42d. The panel holder 43 supports the apparatus 1 with an adhesive applied between them.

While it elastically deforms, the curved portion 42a contacts with a side wall 2a of the fixed vehicle roof 2, and in a similar fashion, the lip portion 42c contacts with the outer peripheral surface 1a of the sunroof panel apparatus 1. In this way, it is possible to prevent dust and water from intruding the cabin of a vehicle. Because the curved portion 42a and the lip-like portion 42c absorb the vibration which occurs in the sunroof panel apparatus 1, sealing provided by the sealing member 40 can be properly maintained.

While the invention has been described in detail and with reference to specific embodiments thereof, it will be apparent to one skilled in the art that various changes and modifications can be made therein without departing from the spirit and scope thereof. The present invention is not limited to the embodiment described above, in which an EL sheet is located above each of the driver's seat, the assistant driver's seat, the rear seat behind the driver's seat and the rear seat behind the assistant driver's seat. For example, it may be possible to dispose an EL sheet above front seats and another EL sheet above rear seats.

Figure 5:
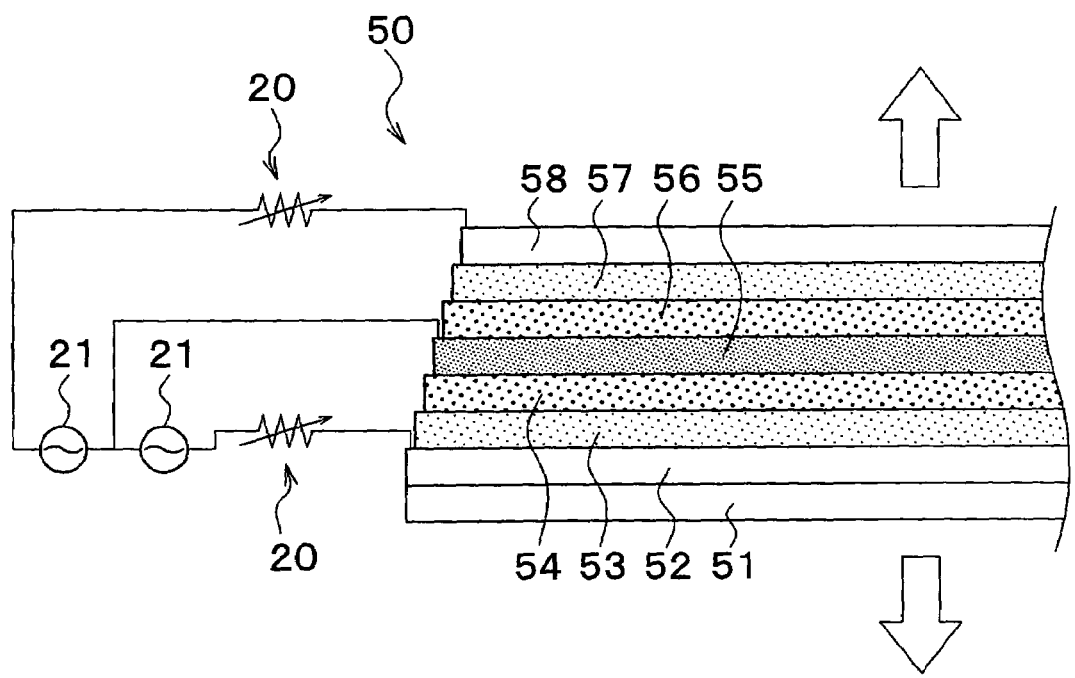
FIG. 5 is a sectional view illustrating an exemplary EL sheet according to the present invention.
Figure 6:
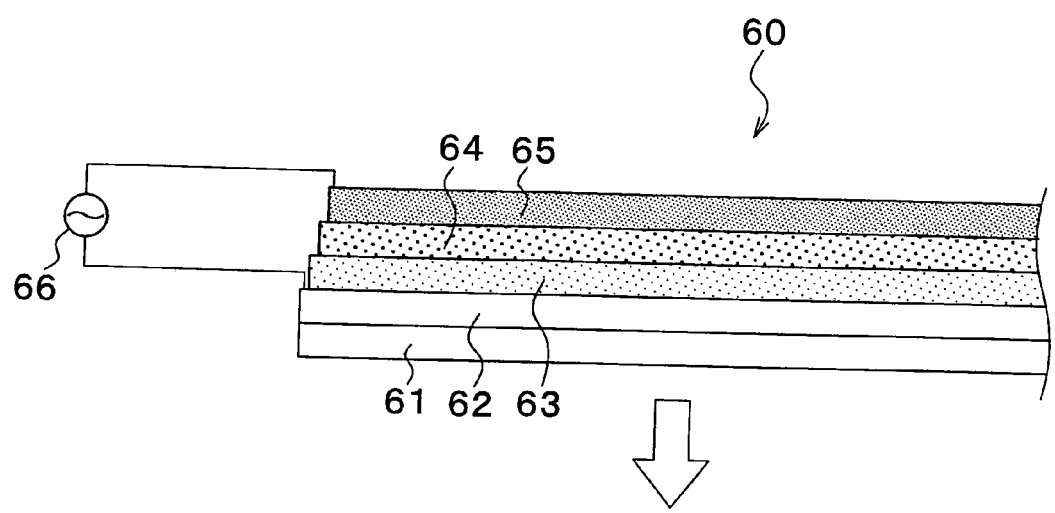
FIG. 6 is a sectional view illustrating an EL sheet according to the prior art.
Figure 7:
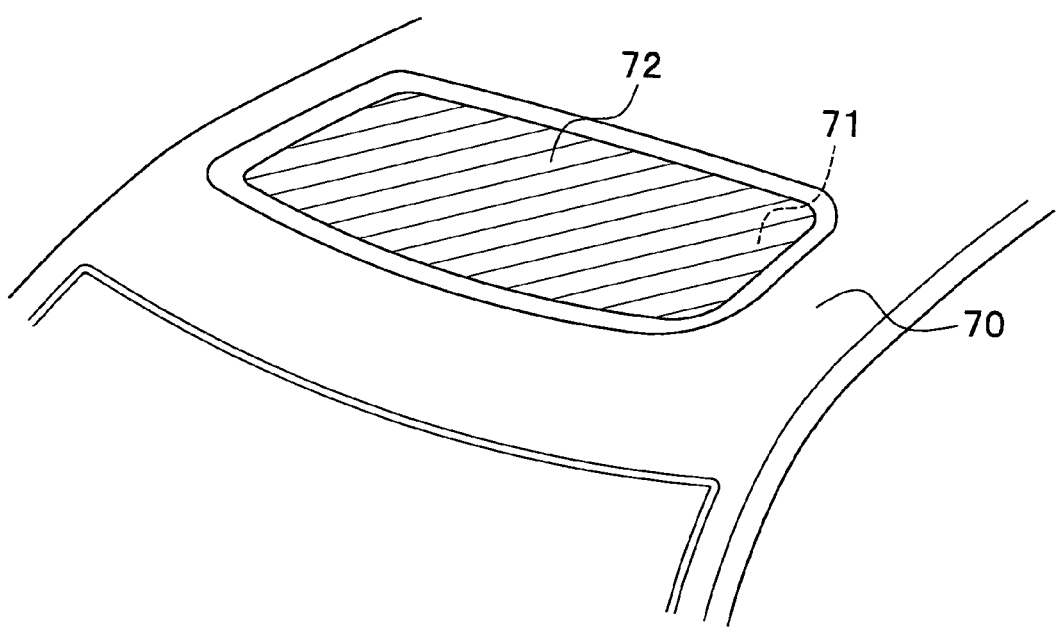
FIG. 7 is a perspective view illustrating a sunroof panel apparatus according to the prior art.

The present invention is not limited to the embodiment described above, in which each EL sheet 4 (see FIG. 2) enclosed in the sunroof panel apparatus 1 has the transparent electrode layer 11, the luminous layer 12, and the insulation layer 13 and the back electrode layer 14 that are one by one laid down on the transparent base plate 10. For example, it may be alternatively possible to adopt another EL sheet 50 having construction as shown in FIG. 5. The EL sheet 50 includes a first transparent electrode layer 52, a first luminous layer 53, a first insulation layer 54 and a back electrode layer 55, and in addition a second insulation layer 56, a second luminous layer 57 and a second transparent electrode layer 58 that are one by one laid down on a transparent base plate 51. In this way, a sunroof panel apparatus having the EL sheet 50 is able to emit light in both inward and outward directions relative to the cabin of a vehicle. It may be possible to use the inward light as a room light and the outward light as one for decoration such as an illumination light. Furthermore, if the terminals, which are provided on the back electrode layer 55 and the second transparent electrode layer 58 respectively, are electrically connected through a variable resister 20 and an AC power supply 21, it is possible to adjust the brightness of illumination light.

Foreign priority document, JP 2003-342898 filed on Oct. 1, 2003 is hereby incorporated by reference.

What is claimed is:

1. A sunroof panel apparatus for a vehicle comprising:
   a pair of sheets of transparent glass;
   a pair of transparent interlayers which is enclosed between the sheets of transparent glass; and
   a plurality of electro-luminescent (EL) sheets which is enclosed between the transparent interlayers, each EL sheet having electrode layers with terminals; wherein the terminals are electrically connected through a variable resister and a power supply.

2. A sunroof panel apparatus for a vehicle comprising:
   a pair of sheets of transparent glass;
   a pair of transparent interlayers which is enclosed between the sheets of transparent glass; and
   a plurality of electro-luminescent (EL) sheets which is enclosed between the transparent interlayers, each EL sheet having electrode layers with terminals; wherein the terminals are electrically connected through a variable resister and a power supply;
   a sheet of inner glass; and
   a condenser lens; wherein the sheet of inner glass and one of the sheets of transparent glass form a space layer and the condenser lens is disposed in the space layer.

3. An apparatus according to claim 1, wherein at least one of the EL sheets emits light in both inward and outward directions relative to a cabin of the vehicle.

4. An apparatus according to claim 1, wherein the plurality of EL sheets include a first luminous layer and a second luminous layer that are positioned one above the other.

5. An apparatus according to claim 1, wherein the plurality of EL sheets comprises an EL sheet which is placed above the driver's side seat and an EL sheet which is placed above an assistant driver's seat side.

6. An apparatus according to claim 1, wherein the plurality of EL sheets comprises an EL sheet which is placed above a front seat and an EL sheet which is placed above a rear seat.

* * * * *